US009117215B2

(12) United States Patent
Lehrer

(10) Patent No.: US 9,117,215 B2
(45) Date of Patent: Aug. 25, 2015

(54) SYSTEM AND METHOD FOR AUTOMATED DESIGN ELEMENT TRANSLATION

(76) Inventor: Matthew Nathan Lehrer, Carlsbad, CA (US)

( * ) Notice: Subject to any disclaimer, the term of this patent is extended or adjusted under 35 U.S.C. 154(b) by 0 days.

(21) Appl. No.: 13/484,660

(22) Filed: May 31, 2012

(65) Prior Publication Data

US 2013/0326003 A1 Dec. 5, 2013

(51) Int. Cl.
*G06F 15/16* (2006.01)
*G06Q 30/00* (2012.01)

(52) U.S. Cl.
CPC .................................... *G06Q 30/00* (2013.01)

(58) Field of Classification Search
CPC .................................................. G06Q 30/00
USPC ........... 709/217; 705/26.1, 26.8, 26.81, 27.1, 705/27.2
See application file for complete search history.

(56) References Cited

U.S. PATENT DOCUMENTS

| | | | | |
|---|---|---|---|---|
| 8,108,267 | B2 * | 1/2012 | Varon | 705/26.5 |
| 2006/0168561 | A1 * | 7/2006 | Wood | 717/109 |
| 2006/0197963 | A1 * | 9/2006 | Royal et al. | 358/1.2 |
| 2009/0083653 | A1 * | 3/2009 | Makoff et al. | 715/780 |
| 2010/0179888 | A1 * | 7/2010 | Warren et al. | 705/27 |
| 2010/0318442 | A1 * | 12/2010 | Paul et al. | 705/26.5 |
| 2011/0060437 | A1 * | 3/2011 | Durham et al. | 700/97 |
| 2011/0099093 | A1 * | 4/2011 | Mills | 705/27.2 |
| 2011/0270947 | A1 * | 11/2011 | Cok et al. | 709/217 |
| 2013/0159866 | A1 * | 6/2013 | Dirsa et al. | 715/738 |

* cited by examiner

*Primary Examiner* — Kostas Katsikis
(74) *Attorney, Agent, or Firm* — James M Smedley LLC; James M. Smedley, Esq.

(57) ABSTRACT

The present invention generally relates to design element translation. In particular, embodiments of the invention are directed to systems and methods for automated design element translation for user defined customizations for one product to an entire suite of products. Preferred embodiments of the invention are accomplished through the use of one or more web-based computing devices.

20 Claims, 4 Drawing Sheets

SYSTEM AND METHOD FOR AUTOMATED DESIGN ELEMENT TRANSLATION

FIELD OF THE INVENTION

The present invention generally relates to design element translation. In particular, embodiments of the invention are directed to systems and methods for automated design element translation for user defined customizations for one product to an entire suite of products. Preferred embodiments of the invention are accomplished through the use of one or more web-based computing devices.

BACKGROUND

There are numerous websites and other software applications that provide users that ability customize apparel and other items (e.g., cups, umbrellas, business cards, promotional materials). These systems typically provide a user the ability to upload an image and have that image displayed on the desired item. In this manner, users are given the ability to view an electronic representation of the physical product they wish to order.

These same systems also frequently allow the user to select other options with respect to the customized item. Options include color, size, cut, font size, engraving or any combination thereof. Again, the user may be provided with an electronic representation of what the physical product would look like if ordered. Once the item is fully customized, the user is typically provided the ability to purchase the item and have it delivered to them.

One drawback that all the systems presently used is that customization only occurs for a single item at a time. If a user is attempting to buy numerous items, the user will have to configure/customize each item individually. This can be especially time consuming, especially where customized items are being purchased for a large group of people where each person is receiving one or more personalized items (e.g., sports teams, clubs/organizations, promotional materials for meetings).

Currently, there are no systems that allow you to carry over design elements (e.g., size, cut, logo, lines, font characteristics, names) to multiple items. Users are simply stuck either entering each item into the system one by one.

Therefore, there is need in the art for a system and a method for automating the translation of design elements to an entire suite of products. These and other features and advantages of the present invention will be explained and will become obvious to one skilled in the art through the summary of the invention that follows.

SUMMARY OF THE INVENTION

Accordingly, it is an aspect of the present invention to provide a system and a method for automating the translation of design elements to an entire suite of products.

According to an embodiment of the present invention, a web-based system for automated design element translation includes: a design element module comprising computer-executable code stored in non-volatile memory; a design conversion module comprising computer-executable code stored in non-volatile memory; a communications means comprising computer-executable code stored in non-volatile memory, wherein said design element module, said design conversion module and said communications means are operably connected; and wherein the design element module, design conversion module and communications means are configured to collectively perform the steps of: receiving one or more design elements from a user; storing said one or more design elements; translating one or more design elements onto a plurality of electronic representations of products; and transmitting, to said user, one or more of said plurality of electronic representations of products.

According to an embodiment of the present invention, the system may further include an order fulfillment module, said order fulfillment module comprising computer-executable code stored in non-volatile memory.

According to an embodiment of the present invention, the order fulfillment module is configured to receive one or more of said plurality of electronic representations of products and process them into one or more physical products containing one or more of said one or more design elements.

According to an embodiment of the present invention, the order fulfillment module is configured to send said one or more physical products to said user.

According to an embodiment of the present invention, the design elements include an image.

According to an embodiment of the present invention, the design elements include a logo.

According to an embodiment of the present invention, the design elements include a color theme.

According to an embodiment of the present invention, the design elements include a name.

According to an embodiment of the present invention, the design elements include font characteristics.

According to an embodiment of the present invention, the design elements include cut and design lines.

According to an embodiment of the present invention, web-based method for automated design element translation includes the steps of: receiving, at a communications means, one or more design elements from a user; storing, via a design element module, said one or more design elements; translating, at a design conversion module, one or more design elements onto a plurality of electronic representations of products; and transmitting, via said communications means, to said user, one or more of said plurality of electronic representations of products.

According to an embodiment of the present invention, the method may further include the steps of: receiving, at an order fulfillment module, one or more of said plurality of electronic representations of products; and processing said one or more of said plurality of electronic representations of products into one or more physical products containing one or more of said one or more design elements.

According to an embodiment of the present invention, the method may further include the step of sending, via said order fulfillment module, said one or more physical products to said user.

The foregoing summary of the present invention with the preferred embodiments should not be construed to limit the scope of the invention. It should be understood and obvious to one skilled in the art that the embodiments of the invention thus described may be further modified without departing from the spirit and scope of the invention.

DETAILED SPECIFICATION

The present invention generally relates to design element translation. In particular, embodiments of the invention are directed to systems and methods for automated design element translation for user defined customizations for one product to an entire suite of products. Preferred embodiments of the invention are accomplished through the use of one or more web-based computing devices.

Figure 1:
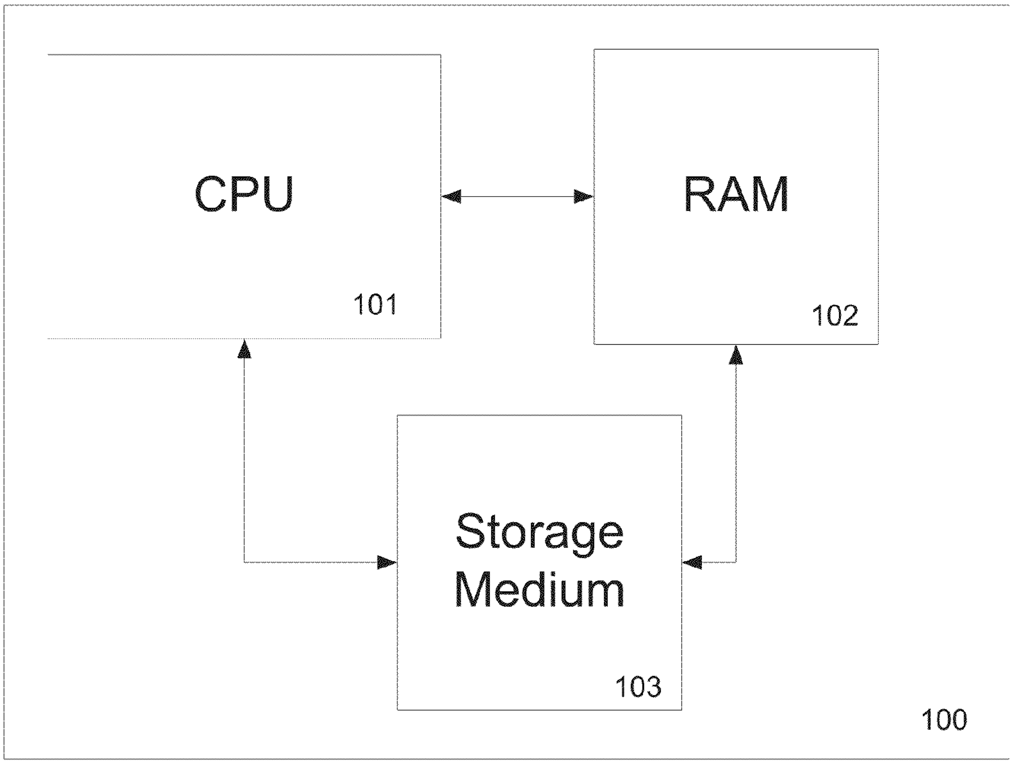
FIG. 1 illustrates a schematic overview of a computing device, in accordance with an embodiment of the present invention.

According to an embodiment of the present invention, the system and method is accomplished through the use of one or more computing devices. As shown in FIG. 1, One of ordinary skill in the art would appreciate that a computing device 100 appropriate for use with embodiments of the present application may generally be comprised of one or more of a Central processing Unit (CPU) 101, Random Access Memory (RAM) 102, and a storage medium (e.g., hard disk drive, solid state drive, flash memory, cloud storage) 103. Examples of computing devices usable with embodiments of the present invention include, but are not limited to, personal computers, smart phones, laptops, mobile computing devices, tablet PCs and servers. The term computing device may also describe two or more computing devices communicatively linked in a manner as to distribute and share one or more resources, such as clustered computing devices and server banks/farms. One of ordinary skill in the art would understand that any number of computing devices could be used, and embodiments of the present invention are contemplated for use with any computing device.

In an exemplary embodiment according to the present invention, data may be provided to the system, stored by the system and provided by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present invention are contemplated for use with any configuration.

In general, the system and methods provided herein may be consumed by a user of a computing device whether connected to a network or not. According to an embodiment of the present invention, some of the applications of the present invention may not be accessible when not connected to a network, however a user may be able to compose data offline that will be consumed by the system when the user is later connected to a network.

Figure 2:
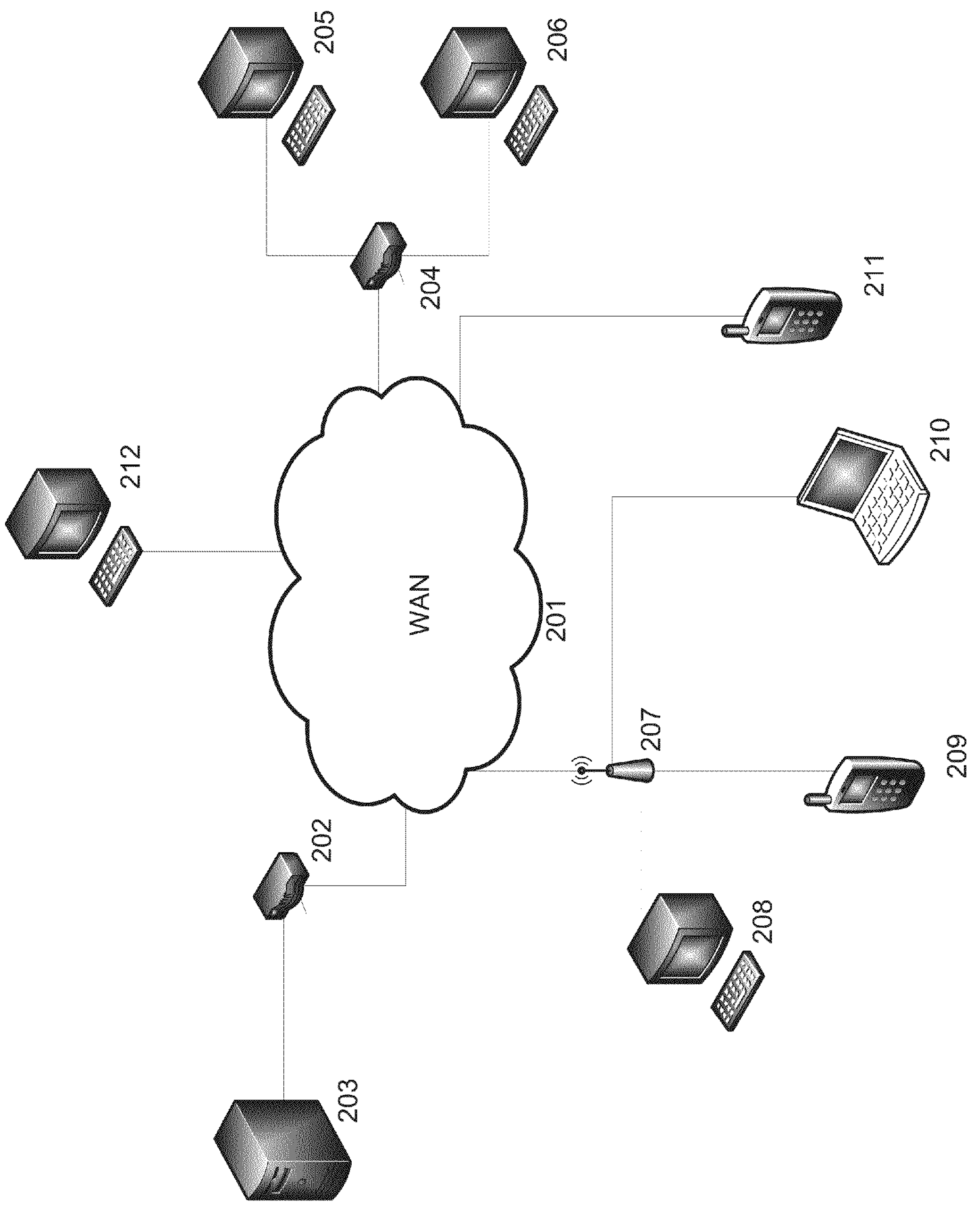
FIG. 2 illustrates a network schematic of a system, in accordance with an embodiment of the present invention.

Referring to FIG. 2, a schematic overview of a system in accordance with an embodiment of the present invention is shown. The system is comprised of one or more application servers 203 for electronically storing information used by the system. Applications in the application server 203 may retrieve and manipulate information in storage devices and exchange information through a WAN 201 (e.g., the Internet). Applications in server 203 may also be used to manipulate information stored remotely and process and analyze data stored remotely across a WAN 201 (e.g., the Internet).

According to an exemplary embodiment, as shown in FIG. 2, exchange of information through the WAN 201 or other network may occur through one or more high speed connections. In some cases, high speed connections may be over-the-air (OTA), passed through networked systems, directly connected to one or more WANs 201 or directed through one or more routers 202. Router(s) 202 are completely optional and other embodiments in accordance with the present invention may or may not utilize one or more routers 202. One of ordinary skill in the art would appreciate that there are numerous ways server 203 may connect to WAN 201 for the exchange of information, and embodiments of the present invention are contemplated for use with any method for connecting to networks for the purpose of exchanging information. Further, while this application refers to high speed connections, embodiments of the present invention may be utilized with connections of any speed.

Components of the system may connect to server 203 via WAN 201 or other network in numerous ways. For instance, a component may connect to the system i) through a computing device 212 directly connected to the WAN 201, ii) through a computing device 205, 206 connected to the WAN 201 through a routing device 204, iii) through a computing device 208, 209, 210 connected to a wireless access point 207 or iv) through a computing device 211 via a wireless connection (e.g., CDMA, GMS, 3G, 4G) to the WAN 201. One of ordinary skill in the art would appreciate that there are numerous ways that a component may connect to server 203 via WAN 201 or other network, and embodiments of the present invention are contemplated for use with any method for connecting to server 203 via WAN 201 or other network. Furthermore, server 203 could be comprised of a personal computing device, such as a smartphone, acting as a host for other computing devices to connect to.

Figure 3:
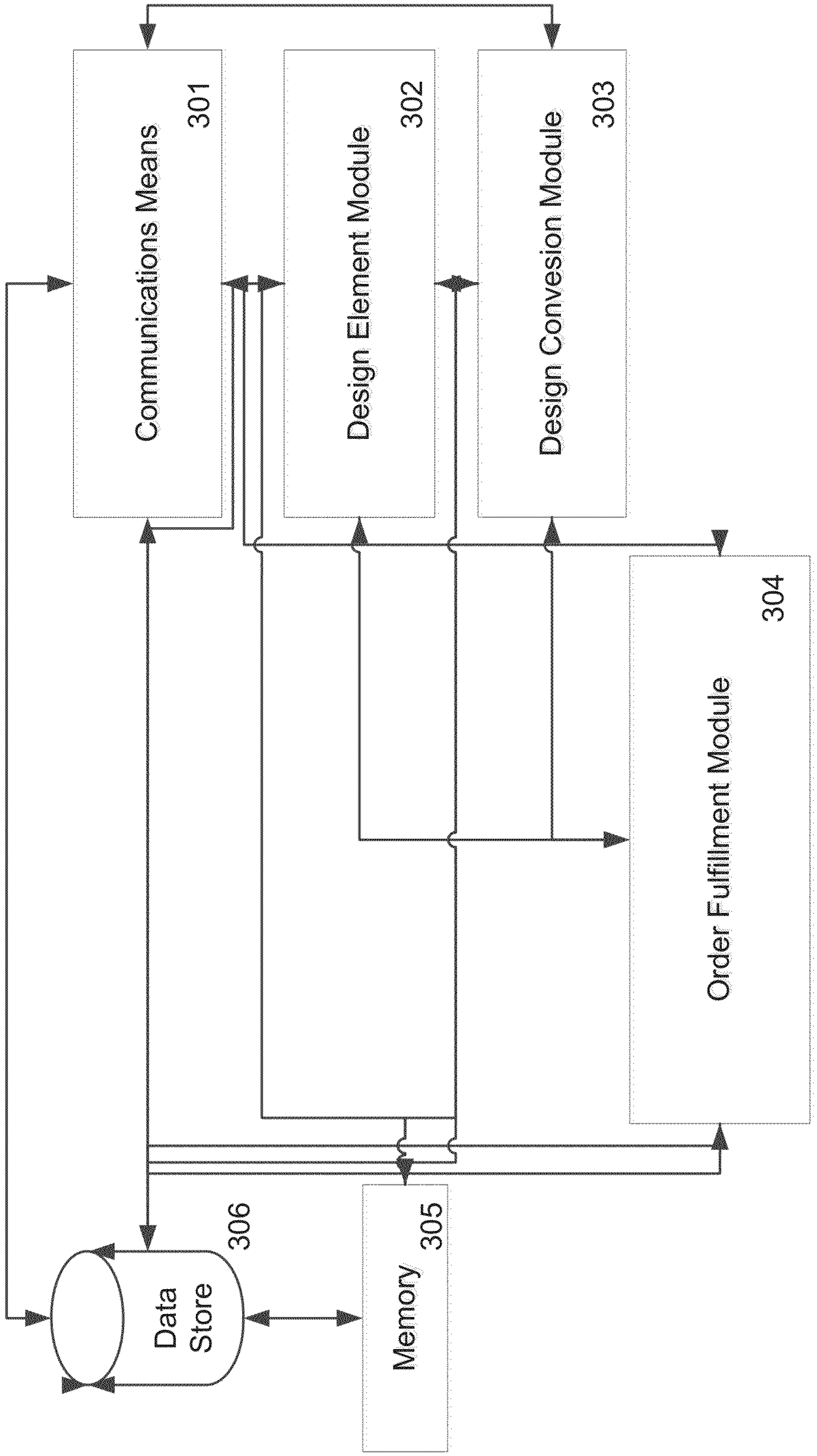
FIG. 3 is a schematic of an exemplary system, in accordance with an embodiment of the present invention.

Turning now to FIG. 3, an exemplary embodiment of the system is shown. In this embodiment, the system includes a communications means 301, a design element module 302, a design conversion module 303, an order fulfillment module 304, a non-transitory memory 305 and a data store 306. While the embodiment shown in FIG. 3 is an exemplary embodiment, other embodiments may include additional or fewer components. One of ordinary skill in the art would appreciate that there are numerous configurations of the components that could be utilized with embodiments of the present invention, and embodiments of the present invention are contemplated for use with any configuration of components.

According to an embodiment of the present invention, the communications means of the system may be, for instance, any means for communicating data over one or more networks. Appropriate communications means may include, but are not limited to, wireless connections, wired connections, cellular connections, data port connections, Bluetooth connections, fiber optic connections, modems, network interface cards or any combination thereof. One of ordinary skill in the art would appreciate that there are numerous communications means that may be utilized with embodiments of the present invention, and embodiments of the present invention are contemplated for use with any communications means.

According to an embodiment of the present invention, the design element module may be comprised of computer-executable code stored in non-transitory memory and a processing means (e.g., CPU) configured to process the computer-executable code. The design element module is configured to receive design elements from users or retrieve/provide design elements to the user from standard template design elements and perform various functions on those design elements. Design elements include, but are not limited to, colors, lines, shapes, logos, text, names, cuts, sizes, font properties, numbers or any combination thereof. One of ordinary skill in the art would appreciate that there are numerous design elements that could be utilized with embodiments of the present invention, and embodiments of the present invention are contemplated for use with any type of design element.

Additionally the design element module may be configured to store and utilize design elements in a relational manner. For example, a set of particular design elements may be associated with particular entities (e.g., each member of a team) and a common pool of design elements (e.g., team colors, design element placements, patterns, text) can be utilized as well. In combination, the set of design elements associated with particular entities (e.g., names of each player, number of each player, size of each player) and common pool design elements can be utilized together to efficiently allow other elements of the system to automate the generation of electronic representations of a suite of products.

According to an embodiment of the present invention, actions that can be processed by the design element module include, but are not limited to, storing design elements in a data store or memory, relating design elements, creation of relational matching, subset creation, preference selection, retrieving design elements from a data store or memory, processing changes to design elements or any combination thereof. One of ordinary skill in the art would appreciate that there are numerous functions the design element module could perform, and embodiments of the present invention are contemplated for use with design element modules configured to perform any number of functions related to design elements.

According to an embodiment of the present invention, the design element module may be configured to work in conjunction with a storage medium, data store, memory or other recording means for the purpose of storing design elements for later use or for associating design elements with the preferences of one or more users. In this manner, users can utilize the system over multiple orders and have their design elements quickly and conveniently accessible to them.

According to an embodiment of the present invention, the design conversion module may be comprised of computer-executable code stored in non-transitory memory and a processing means (e.g., CPU) configured to process the computer-executable code. The design conversion module is configured to receive one or more sets of design elements from one or more design element modules and process electronic representations of one or more products where each electronic representation contains one or more of the design elements.

In a preferred embodiment of the present invention, the conversion process performed by the design conversion module is based, at least in part, on characteristics provided by the user. Most commonly, the user will request one or more customized products based on one or more design elements or sets of design elements. The design conversion module will then take these characteristics and design elements and create electronic representations of one or more products which will in turn be provided to the user for review.

Depending on the items to be customized and the design elements provides, the design conversion module may be configured to utilize one or more design elements for each product to be customized. For instance, if a user wants a customized coffee mug and a customized sports jersey, the design conversion module will utilize only the relevant design elements for each item (e.g., size and cut for the jersey only, image and text for both items, handle shape for the mug only). In this manner, the design conversion module is configured to selectively determine which design elements are appropriate for which products. This determination may be assisted by information stored in one or more data stores associated with the products. These data stores may, for instance, maintain a list of design elements applicable for each item.

According to an embodiment of the present invention, the system may be further configured to utilize an order fulfillment module, comprised of computer-executable code stored in non-transitory memory and a processing means (e.g., CPU) configured to process the computer-executable code. The order fulfillment module is configured to receive the electronic representation of the physical products the user wishes to purchase.

In a preferred embodiment, the order fulfillment module will receive an electronic representation of the customizations the user wishes to have made to the physical products associated with an order. Most commonly, the order fulfillment module will receive data associated with the design elements selected, the products to be customized, quantity, purchasing information and other information related to the order. One of ordinary skill in the art would appreciate that there are numerous data elements that could be associated with an order, and embodiments of the present invention are configured to utilize and data element associated with an order.

According to an embodiment of the present invention, the order fulfillment module may be further configured to automate the production of the requested customized products. Further, the order fulfillment module may be configured to automate the shipping of the requested customized product, including the automation of packaging, preparing shipping documentation and requesting the appropriate pickup for the order by one or more commercial or other shipping vendor.

Exemplary Embodiments

Figure 4:
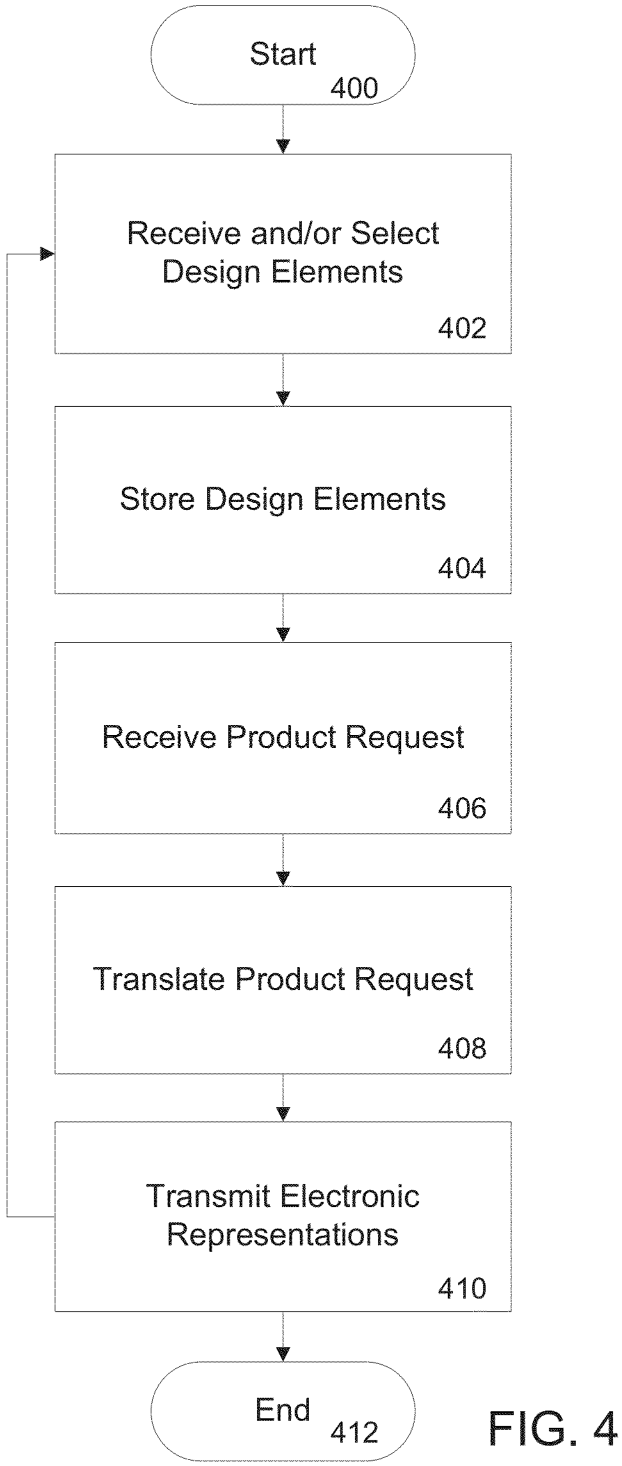
FIG. 4 is a flowchart of an exemplary method in accordance with an embodiment of the present invention.

The following is an exemplary embodiment of a method for utilization of the system and method as described herein, as shown in FIG. 4. At step 400, the process starts with a user contacting the system for the purpose of reviewing or ordering customized products.

At step 402, the user provides to the system one or more design elements for use in the customization process and/or selects from one or more design elements stored on/by the system. As described above, the design elements can be of numerous types and formats, and may be stored or utilized in real-time or near-real time.

At step 404, the system has received the design elements and affects the storage the design elements. Depending on the configuration of the system, the design elements may be stored to a storage medium or data store. Alternatively, the system may be configured to store the image in a memory or other low latency storage medium with the knowledge that the system will soon be taking further action on the image. Keeping the image in memory or low latency storage mediums (e.g., solid state drives) allows for the processing time to be lowered as it takes less time for the system to move the relative data to and from the processor in this manner.

At step 406, the user requests views of one or more products that are to be customized through use of the design elements previously provided by the user. The system may provide the user to select multiple items at a time, each which will be customized by the system for the user's viewing. In this manner, the user is able to view customized items for the possible purchase thereof.

At step 408, the design conversion module of the system is utilized to review the request from the user and translate the various design elements and product requests into electronic representations of the customized products requested by the user. These electronic representations are most commonly images of the various products overlayed with the various design elements placed and utilized in accordance with the design elements and other settings/preferences selected by the user, the system or any combination thereof.

At step 410, the system provides the electronic representations to the user for review. The user may decide to purchase the products based on the electronic representations, at which point the process completes at step 412. Alternatively, the user may request additional modifications to the electronic representations. This can be done by way of providing more design elements to the system and looping back through the method starting at step 402. This can also be achieved by allowing the user to select, deselect or otherwise modify specific design elements for each electronic representation, whether in real-time/near real-time (e.g., via a graphical user interface (GUI)) or via submission of a new request.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, Java, JavaScript, assembly language, HTML, Lisp, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A web-based system for automated design element translation, the system comprising:
- a processor coupled to a memory;
- a network interface unit for communicating over a network;
- a design conversion module; and
- a design element module, wherein the processor, the memory, the network interface unit, the design conversion module, and the design element module are communicatively connected and configured to perform the steps of:
- receiving one or more design elements from a user to customize the appearance of a first product of a plurality of products;
- associating at least one of said one or more design elements with a plurality of entities, wherein an entity in said plurality of entities is not a product;
- associating at least one of said one or more design elements with a common pool of design elements;
- storing said one or more design elements and associations;
- translating one or more of said one or more design elements to customize the appearance of a second product of the plurality of products which (i) shares at least one design element from said common pool of design elements with said first product, (ii) is of a different class of product than said first product and (iii) is at least one of:
- a different size than said first product,
- a different shape than said first product,
- a different material than said first product, or
- a different cut than said first product;
- overlaying a portion of said one or more design elements onto a plurality of electronic representations of said first and second products, wherein each of said plurality of electronic representations of said first and second products includes at least one of said common pool design elements and at least one of said design elements associated with said one or more entities; and
- transmitting, to said user, one or more of said plurality of electronic representations of said first and second products.

2. The web-based system of claim 1, further comprising an order fulfillment module, said order fulfillment module comprising computer-executable code stored in non-volatile memory, wherein said order fulfillment module is configured to receive one or more of said plurality of electronic representations of products and process them into one or more physical products containing one or more of said one or more design elements.

3. The web based system of claim 1 wherein the conversion module translates one or more of said one or more design elements to said second product by determining which design elements said first product and said second product have in common by referring to a data store which lists the design elements that are applicable to each of said first product and said second product.

4. The web-based system of claim 2, wherein said order fulfillment module is configured to send said one or more physical products to said user.

5. The web-based system of claim 1, wherein said design elements include an image.

6. The web-based system of claim 1, wherein said design elements include a logo.

7. The web-based system of claim 1, wherein said design elements include a color theme.

8. The web-based system of claim 1, wherein said design elements include a name.

9. The web-based system of claim 1, wherein said design elements include font characteristics.

10. The web-based system of claim 1, wherein said design elements include cut and design lines.

11. A web-based method for automated design element translation, the method comprising the steps of:

receiving, at a communications means, one or more design elements from a user to customize the appearance of a first product of a plurality of products;

associating, via a design conversion module, at least one of said one or more design elements with a plurality of entities, wherein an entity in said plurality of entities is not a product;

associating, via a design conversion module, at least one of said one or more design elements with a common pool of design elements;

storing, via a design element module, said one or more design elements;

translating, at a design conversion module, one or more of said one or more design elements to customize the appearance of a second product which (i) shares at least one design element from said common pool of design elements with said first product, (ii) is of a different class of product than said first product and (iii) is at least one of:

a different size, a different shape, made of different material, a different cut;

overlaying a portion of said one or more design elements onto a plurality of electronic representations of said first and second products, wherein each of said plurality of electronic representations of said first and second products includes at least one of said common pool design elements and at least one of said design elements associated with said one or more entities; and transmitting, via said communications means, to said user, one or more of said plurality of electronic representations of said first and second products.

12. The web-based system of claim 11, further comprising the steps of:

receiving, at an order fulfillment module, one or more of said plurality of electronic representations of products; and processing said one or more of said plurality of electronic representations of products into one or more physical products containing one or more of said one or more design elements.

13. The web-based system of claim 12, further comprising the step of sending, via said order fulfillment module, said one or more physical products to said user.

14. The web-based method of claim 11, wherein said design elements include an image.

15. The web-based method of claim 11, wherein said design elements include a logo.

16. The web-based method of claim 11, wherein said design elements include a color theme.

17. The web-based method of claim 11, wherein said design elements include a name.

18. The web-based method of claim 11, wherein said design elements include font characteristics.

19. The web-based method of claim 11, wherein said design elements include cut and design lines.

20. The web based method of claim 11 further comprising the step of:

determining which design elements said first product and said second product have in common by referring to a data store which lists the design elements that are applicable to each of said first product and said second product.

* * * * *